United States Patent
Oshnock et al.

(10) Patent No.: US 7,261,302 B2
(45) Date of Patent: Aug. 28, 2007

(54) COLLET AND LOCK NUT ASSEMBLY

(75) Inventors: Robert E. Oshnock, Latrobe, PA (US); Michael R. McCormick, Greensburg, PA (US); Robert A. Erickson, Raleigh, NC (US); Keith Wiggins, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 162 days.

(21) Appl. No.: 11/071,805

(22) Filed: Mar. 3, 2005

(65) Prior Publication Data

US 2006/0197292 A1  Sep. 7, 2006

(51) Int. Cl.
B23B 31/20   (2006.01)

(52) U.S. Cl. ............................. 279/48; 279/42; 279/52; 29/243

(58) Field of Classification Search .................. 279/42, 279/48, 52, 46.1, 43.1, 43.2, 43.3, 43.4, 43.5, 279/46.2, 46.3, 46.4, 46.5; 29/243
See application file for complete search history.

(56) References Cited

U.S. PATENT DOCUMENTS

| | | | | |
|---|---|---|---|---|
| 2,609,209 | A | * | 9/1952 | Perman ........................ 279/49 |
| 3,035,845 | A | * | 5/1962 | Benjamin ..................... 279/47 |
| 3,332,693 | A | * | 7/1967 | Armstrong et al. ........... 279/47 |
| 3,365,204 | A | * | 1/1968 | Benjamin et al. ............. 279/51 |
| 3,451,686 | A | * | 6/1969 | Hammond .................... 279/51 |
| 3,726,532 | A | * | 4/1973 | Zeilinger ..................... 279/52 |
| 3,905,609 | A | * | 9/1975 | Sussman ...................... 279/20 |
| 4,377,292 | A | * | 3/1983 | Staron ........................ 279/46.1 |
| 4,387,906 | A | * | 6/1983 | Nicolin ....................... 279/2.07 |
| 4,699,388 | A | * | 10/1987 | Sproccati et al. ............. 279/48 |
| 4,817,972 | A | * | 4/1989 | Kubo ........................... 279/42 |
| 5,405,220 | A | * | 4/1995 | Ishikawa ...................... 408/56 |
| 5,567,093 | A | * | 10/1996 | Richmond ................... 409/136 |
| 6,209,886 | B1 | * | 4/2001 | Estes et al. ................... 279/50 |
| 6,923,451 | B2 | * | 8/2005 | Taguchi et al. ............... 279/42 |

FOREIGN PATENT DOCUMENTS

| | | | | |
|---|---|---|---|---|
| DE | 2337175 | A | * | 5/1974 |
| EP | 263982 | A1 | * | 4/1988 |
| JP | 2001219310 | A | * | 8/2001 |
| JP | 2002059304 | A | * | 2/2002 |
| JP | 2004276179 | A | * | 10/2004 |
| JP | 2005066758 | A | * | 3/2005 |
| WO | WO 00/14502 | A1 | | 3/2000 |

* cited by examiner

*Primary Examiner*—Monica Carter
*Assistant Examiner*—Michael W. Talbot
(74) *Attorney, Agent, or Firm*—Larry R. Meenan

(57) ABSTRACT

A collet and lock nut assembly includes a collet for receiving a cutting tool shank and a lock nut for creating a gripping force between the collet and the shank. The collet has a nose portion and a body portion separated by an annular groove. The lock nut has a plurality of retention tabs and a corresponding number of clear portions. The collet and lock nut assembly can be easily assembled by inserting at least one retention tab within the groove of the collet, and then applying pressure to the collet such that the remaining retention tabs of the lock nut are received within the groove of the collet to place the assembly in a locked position. The collet and cutting tool shank can be drawn from the tool holder by applying rotational torque to the lock nut. The collet is easily removed from the lock nut by applying pressure in any circumferential, lateral direction against the collet.

15 Claims, 6 Drawing Sheets

COLLET AND LOCK NUT ASSEMBLY

FIELD OF THE INVENTION

The present invention relates to chucks and sockets and, more particularly, to a collet and lock nut assembly for use with machine tools. Most particularly, the invention relates to a collet and lock nut assembly having a lock nut that allows easy, clip-in entry of the collet, while ensuring removal of the collet and cutting tool from the chuck.

BACKGROUND OF THE INVENTION

Collets for use in tool-holding chuck assemblies are well known. Such collets generally comprise a tubular body formed from a plurality of elongated, flexible steel fingers. The fingers are separated by longitudinal collet saw slots that impart some degree of radial flexibility to the collet, which allows the collet to selectively grip the shank of a cutting tool, such as a drill bit. Adjacent gripping fingers are interconnected by an alternating pattern of metal webs to form a one-piece collet body. In operation, the collet body is inserted in a complementary-shaped opening in a chuck shaft so that a distal end of the collet body projects out of the shaft. An annular lock nut having an inner diameter screw thread that matches an outer diameter screw thread on the shaft is then installed over the shaft and distal end of the collet body. The lock nut has a nose ring with a frustoconical cam surface that engages the distal end of the collet body and squeezes it radially inwardly as the lock nut is screwed onto the chuck shaft. The radial compression that the lock nut applies to the distal end of the collet body flexes the body inwardly, creating a gripping force between the inner diameter of the collet body and a tool shank inserted therein.

Unfortunately, existing lock nuts used for tightening collets into the chuck have a tendency to disengage with the collet if the operator is not careful when installing the collet into the lock nut. If the collet is accidentally disengaged from the lock nut prior to assembly with the chuck, the collet will lock down properly, but the lock nut will not be able to remove the collet from the chuck. The lock nut can be unscrewed from the chuck, but the collet and cutting tool are left inside the chuck. When this occurs, the only way to remove the collet is to unthread the retention knob and drive the collet out from the rear of the tool holder by using a drift.

One solution to this problem is to clip the collet inside the lock nut prior to tightening the lock nut onto the tool holder chuck. This method uses an eccentric oval arranged inside the lock nut that is machined either larger or slightly smaller than the collet diameter. One example of such an eccentric oval arrangement is described in WO00/14502. Although the collet and lock nut will be held together to prevent misalignment during assembly, this method provides only two points of contact on the lock nut to draw the locked collet and cutting tool out of the tool holder chuck. In addition, additional machining must take place to balance the eccentric bore.

Thus, there is a need for an improved collet and lock nut assembly that is naturally balanced, while allowing easy entry of the collet into the lock nut, while providing additional points of contact to assure that the lock nut will remove the collet and cutting tool from the chuck.

SUMMARY OF THE INVENTION

Generally speaking, the invention is directed to an assembly generally comprising a collet for receiving a cutting tool shank a lock nut for creating a gripping force between the collet and the cutting tool shank. The collet has a nose and the lock nut has a front face that is substantially flush with the nose.

The invention is also directed to an assembly comprising a collet and a lock nut. The collet includes a tubular collet body having a nose and defining a cylindrically shaped passageway for receiving the tool shank. The lock nut is formed from an annular housing having a front face, which is substantially flush with the nose of the collet body, and a fastening element.

BRIEF DESCRIPTION OF THE DRAWINGS

Further features of the present invention, as well as the advantages derived therefrom, will become clear from the following detailed description made with reference to the drawings in which.

DETAILED DESCRIPTION OF THE INVENTION

Figure 1:
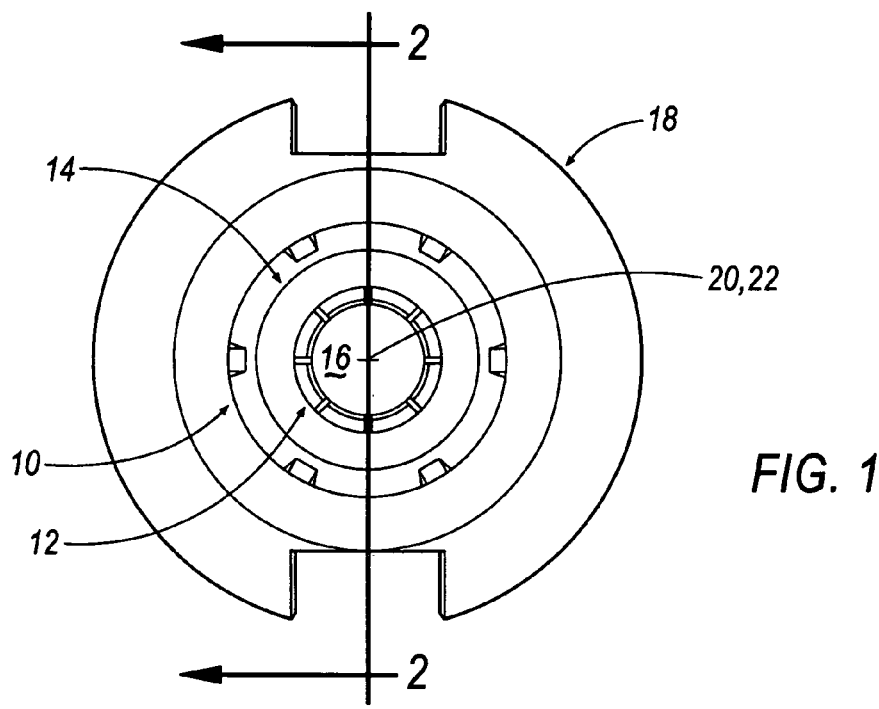
FIG. 1 is a front view of a collet and lock nut assembly mounted in a tool holder according to an embodiment of the invention.
Figure 2:
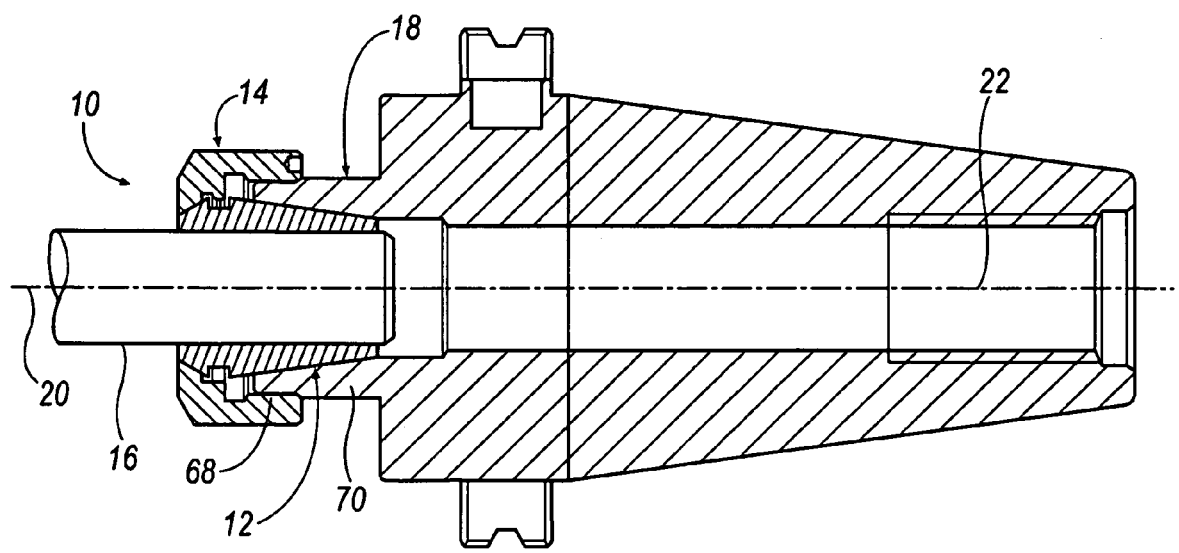
FIG. 2 is a cross-sectional view of the collet and lock nut assembly when mounted in the tool holder taken along line 2-2 in FIG. 1.

With reference now to the drawings, wherein like numerals designate like components throughout all of the several figures, there is illustrated in FIGS. 1 and 2 a collet and lock nut assembly shown generally at 10. The collet and lock nut assembly or chuck assembly 10 comprises a collet 12 and a lock nut 14. The collet 12 is adapted to receive a shank 16 of a cutting tool (not shown), while the collet and lock nut assembly 10 is adapted to be mounted to a chuck of a tool holder, shown generally at 18. When the shank 16 of the cutting tool is properly mounted to the tool holder 18 by the collet and lock nut assembly 10, a centerline 20 of the shank 16 is substantially aligned with a centerline 22 of the tool holder.

Figure 3:
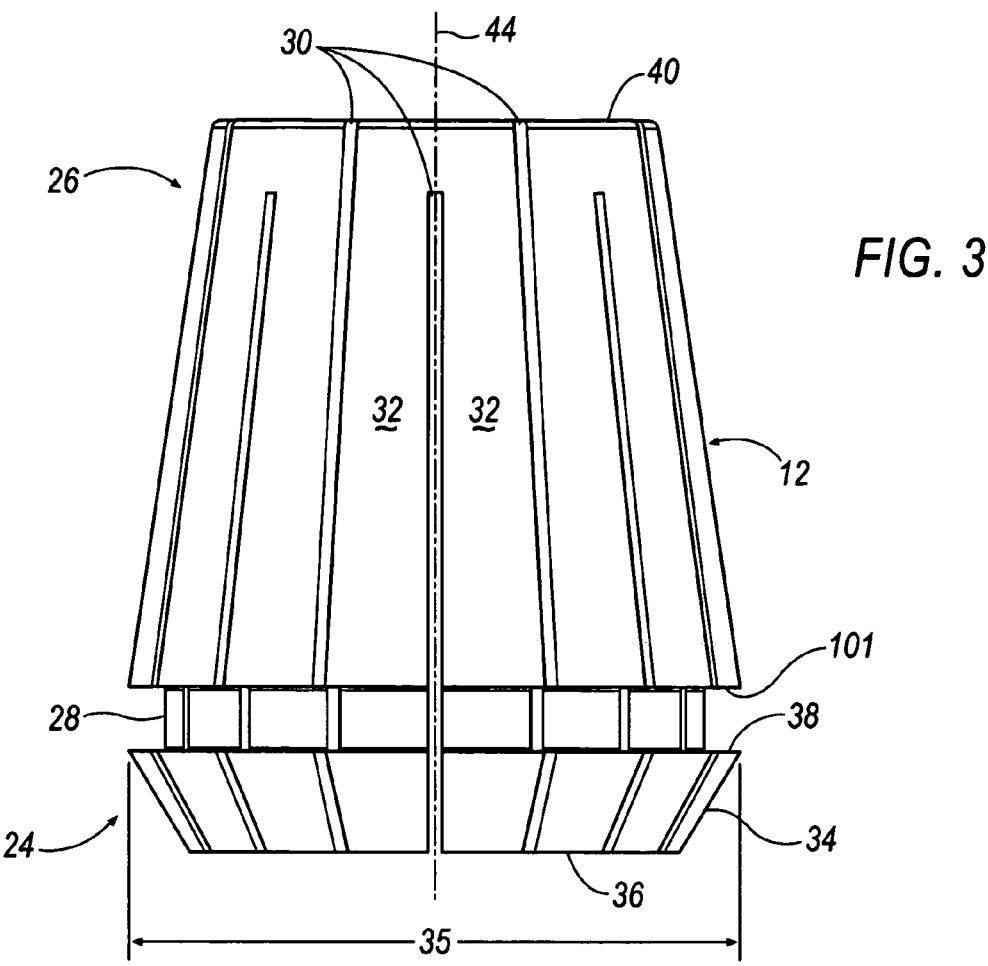
FIG. 3 is a side elevational view of the collet according to an embodiment of the invention.
Figure 4:
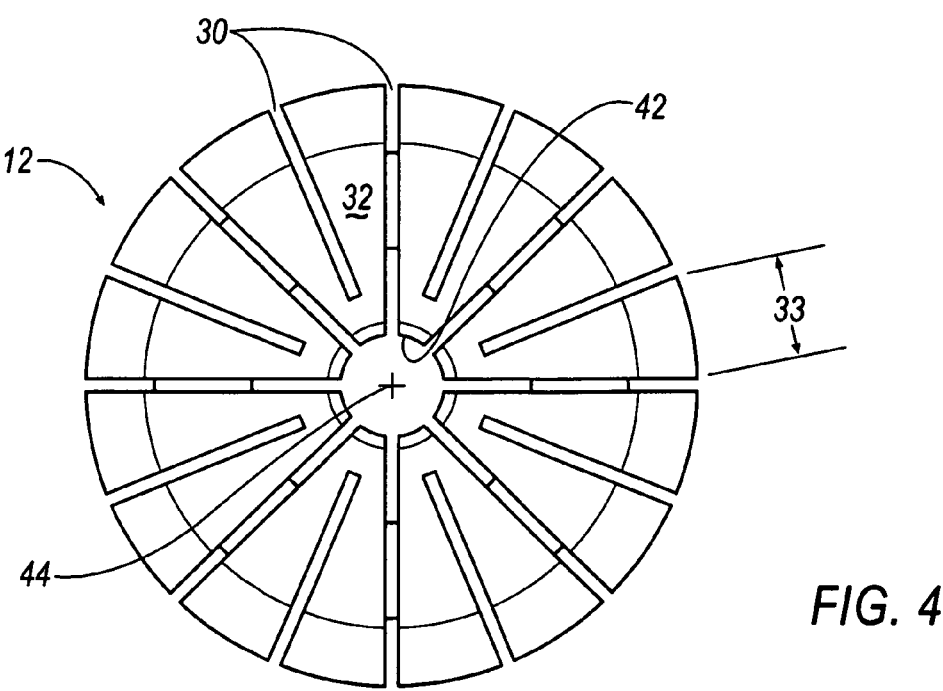
FIG. 4 is a front view of the collet shown in FIG. 3.

Referring now to FIGS. 3 and 4, the collet 12 is made from a resilient steel alloy and generally comprises a nose portion 24 and a body portion 26 separated by an annular recess or groove 28. The collet 12 includes a generally parallel array of slots 30 separated by webs or gripping fingers 32 having a radial dimension 33. The presence of the slots 30 allow the collet 12 to be radially compressed by the lock nut 14 to grip the shank 16 of the cutting tool. The outside surface of the nose portion 24 of the collet 12 includes an angled nose 34 that extends between the groove 28 and a front surface 36 of the collet 12. Specifically, the angled nose 34 tapers inwardly from the annular groove 28 to a front surface 36 of the collet 12. As described in more detail below, the angled nose 34 acts as a cam surface that cooperates with the lock nut 14 to radially compress the gripping fingers 32 into gripping engagement with the shank 16 of the cutting tool. A ledge 38 is provided behind the angled nose 34 to facilitate the removal of the collet 12 from the tool holder 18 via the lock nut 14. As its widest point proximal the annular groove 28, the angled nose 34 defines a nose diameter 35. The body portion 26 of the collet 12 is generally frustoconical in shape and tapers inwardly from the annular recess 28 to a back surface 40. As seen in FIG. 4, the collet 12 further includes a cylindrically-shaped passageway 42 that is concentrically provided along an axis of rotation 44 of the collet 12 for receiving the shank 16 of the cutting tool, which may be, for example, a drill bit, or the like.

Figure 5:
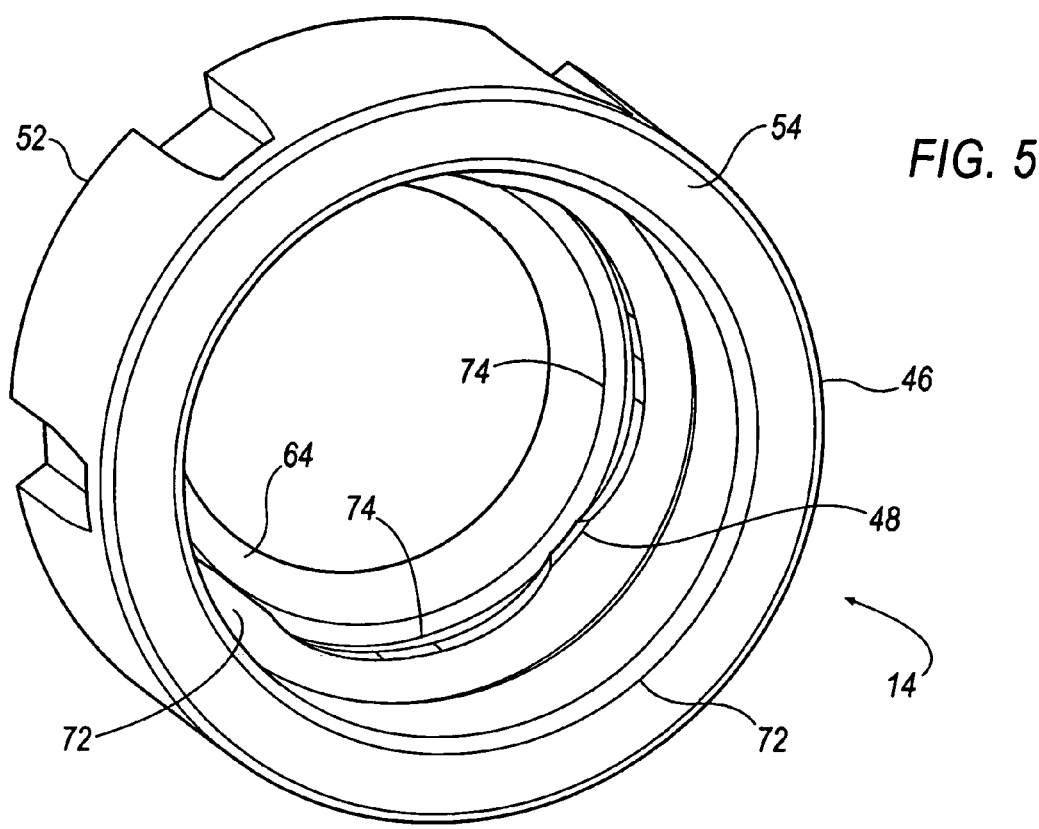
FIG. 5 is a rear perspective view of a lock nut according to an embodiment of the invention.
Figure 6:
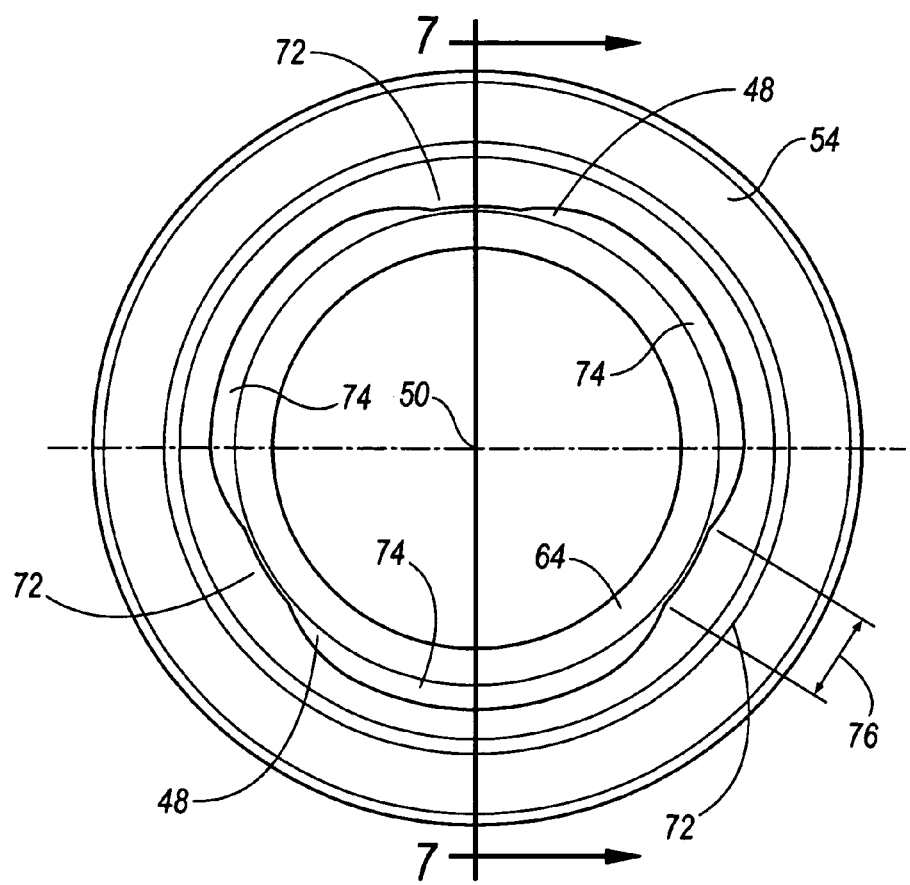
FIG. 6 is a rear view of the lock nut shown in FIG. 5.
Figure 7:
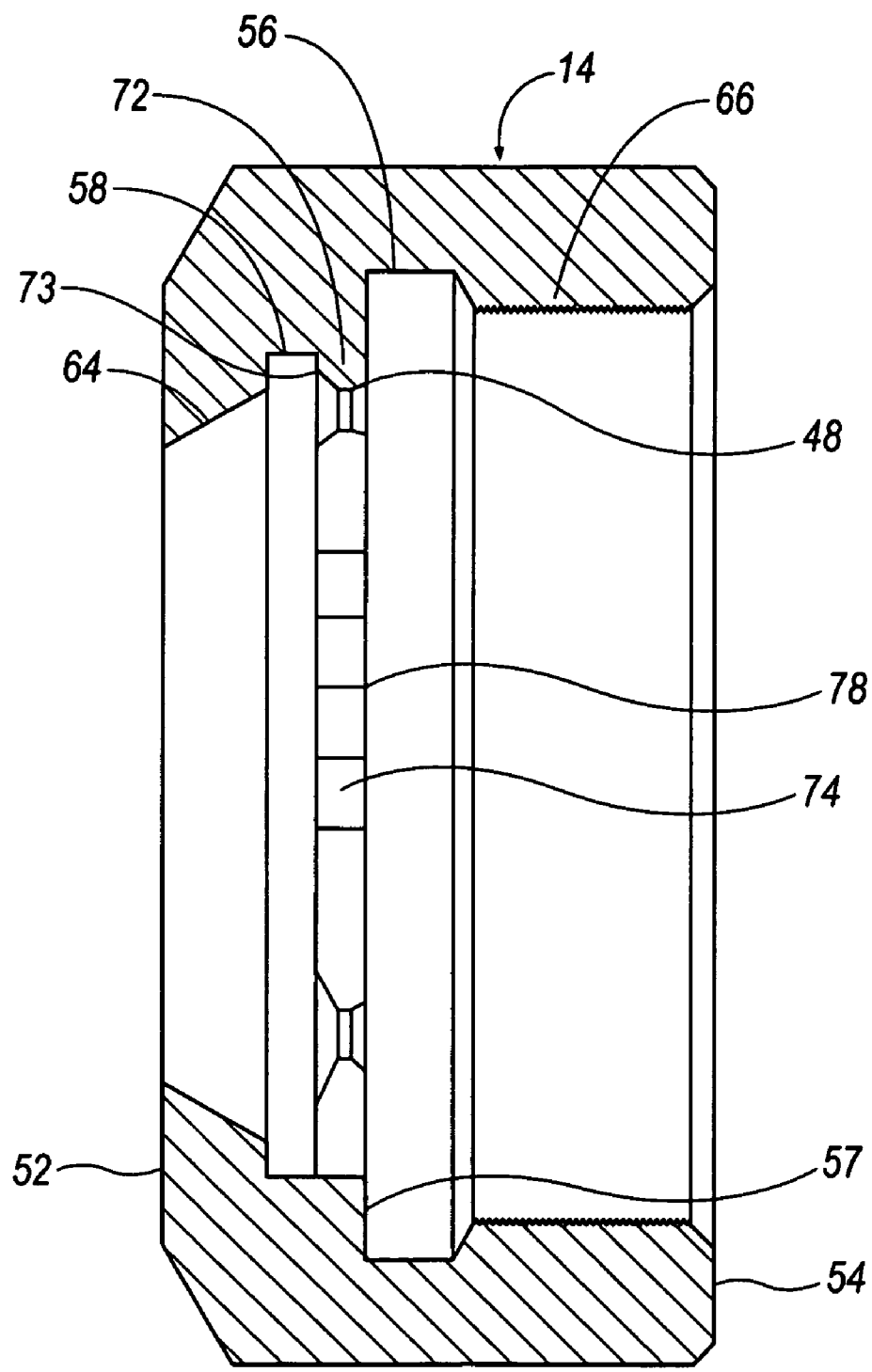
FIG. 7 is a cross-sectional view of the lock nut taken along line 7-7 in FIG. 6.

Referring now to FIGS. 5-7, the lock nut 14 is formed of an annular body 46 having a bore 48 that is concentrically provided along an axis of rotation 50 of the lock nut 14. As seen in FIG. 7, the annular body 46 includes a front surface 52 and a rear surface 54. The inside of the lock nut 14 includes a first groove 56 generally centrally located within the inside of the lock nut 14. The first groove 56 includes a retaining wall 57 formed by the difference between the inner diameters of the bore 48 and the first groove 56. In addition, the inside of the lock nut 14 includes a second groove 58 that is situated between the first groove 56 and the front surface 52 of the lock nut 14. In the illustrated embodiment, the second groove 58 has a relatively smaller diameter than the first groove 56.

The inside of the lock nut 14 also includes an angled surface 64 extending between the second groove 58 and the front surface 52. Specifically, the angled surface 64 tapers inwardly from the second groove 58 to the front surface 52 of the lock nut 14. The angled surface 64 of the lock nut 14 acts as a cam surface that cooperates with the angled surface 34 of the collet 12 to radially compress the gripping fingers 32 of the collet 12 into gripping engagement with the shank 16 of the cutting tool. The annular body 46 of the lock nut 14 includes a screw thread 66 (FIG. 7) that circumscribes its inner diameter and is engageable with a screw thread 68 that circumscribes a chuck 70 of the tool holder 18, as shown in FIG. 2.

One aspect of the invention is that the bore 48 of the lock nut 14 includes a plurality of retention tabs 72 and a corresponding number of clear portions 74. In the illustrated embodiment, the lock nut 14 includes three retention tabs 72 and three clear portions 74 that are symmetrically positioned approximately 120° offset from each other about the concentric bore 48. However, it will be appreciated that the invention is not limited by the number of retention tabs and clear portions, and that the invention can be practiced with any desirable number of tabs and clear portion. For example, the invention can be practiced with two tabs and clear portions positioned approximately 180° offset from each other. In another example, the invention can be practiced with four tabs and clear portions positioned approximately 90° offset from each other.

For ease of assembly, each retention tab 72 has a radial dimension 76 that is preferably less than the radial dimension 33 of each gripping finger 32 of the collet 12 such that each retention tab 72 will engage only a single respective gripping finger 32. In addition, each retention tab 72 is preferably spaced about the bore 48 such that the retention tabs 72 will match up with the spacing of the gripping fingers 32. As mentioned above, the retention tabs 72 are symmetrically disposed about the concentric bore 48. However, it will be appreciated that the retention tabs 72 do not have to symmetrically located about the bore 48, but can be located at any desired location that will match up with the spacing of the gripping fingers 32. In addition, it will be appreciated that the radial dimension 76 of one or more retention tabs 72 can vary. For example, the radial dimension 76 of the two lower retention tabs 72 can be smaller than the radial dimension 76 of the top retention tab 72. However, it should be appreciated that varying the symmetry of the retention tabs 72 and/or the radial dimension 76 may disturb the natural balance of the assembly 10. However, the two retention tabs 72 can be arranged in a fashion where additional high speed balancing may not be necessary.

Figure 8:
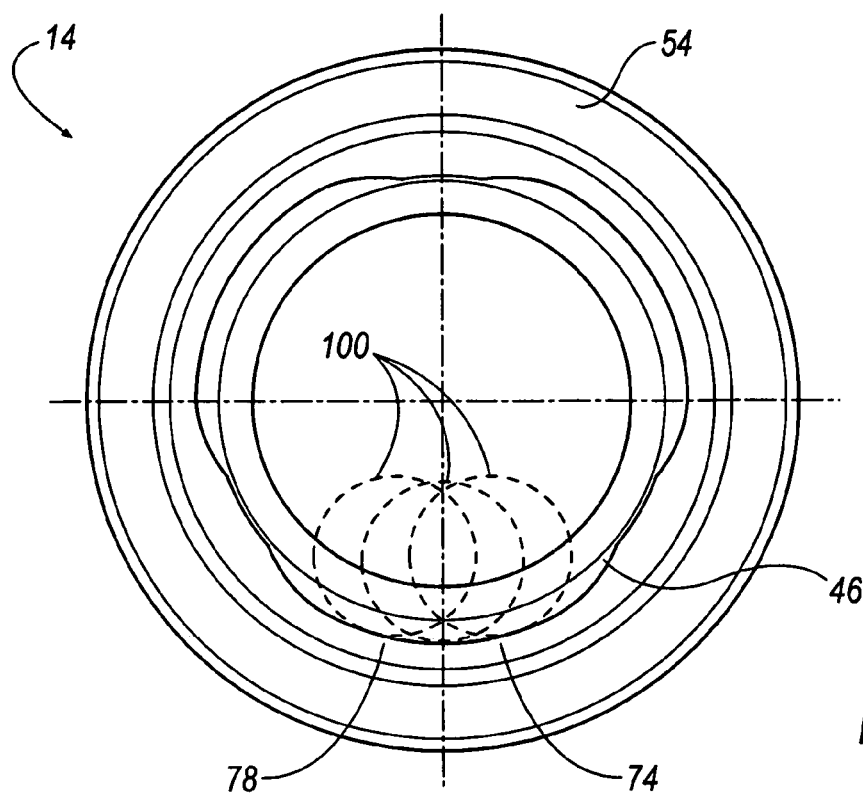
FIG. 8 is a rear view of the lock nut shown in FIG. 5 illustrating the formation of clear portions and retaining tabs according to one method of the invention.

In the illustrated embodiment, the retention tabs 72 can be formed by machining the plurality of clear portions 74 about the bore 48. The machining of the clear portions 74 can be accomplished by using a variety of methods. For example, one method for machining the clear portions 74 is shown in FIG. 8. In this example, a small diameter end mill 100 is used to perform a series of plunges from the rear of the lock nut 14 to form each clear portion 74. Specifically, each plunge of the end mill 10 penetrates the bore 48 and stops after entering and produces an intersection mark 78 in the clear portion 74. In the illustrated embodiment of FIG. 7, four plunges were performed producing four intersection marks 78 in the clear portion 74 on the bore 48.

Figure 9:
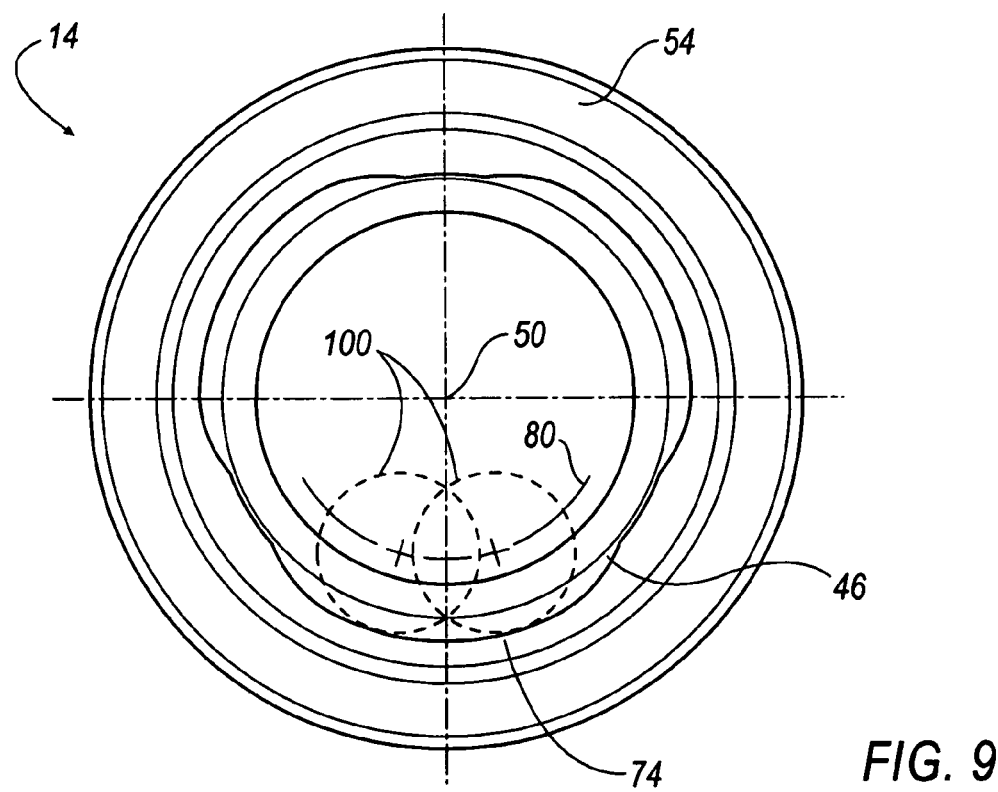
FIG. 9 is a rear view of the lock nut shown in FIG. 5 illustrating the formation of clear portions and retaining tabs according to an alternate method of the invention.

In another example shown in FIG. 9, the clear portions 74 can be machined by a single plunge of the small diameter end mill 100, and then moving the end mill 100 in a radial concentric path 80 around the rotation axis 50 of the lock nut 14 to form each clear portion 74. In this example, all the clear portions 74 can be produced without withdrawing the end mill 100 from the bore 48 of the lock nut 14 by interrupting the radial concentric path 80 of the end mill 100 as it moves around the rotation axis 50 of the lock nut 14.

Figure 10:
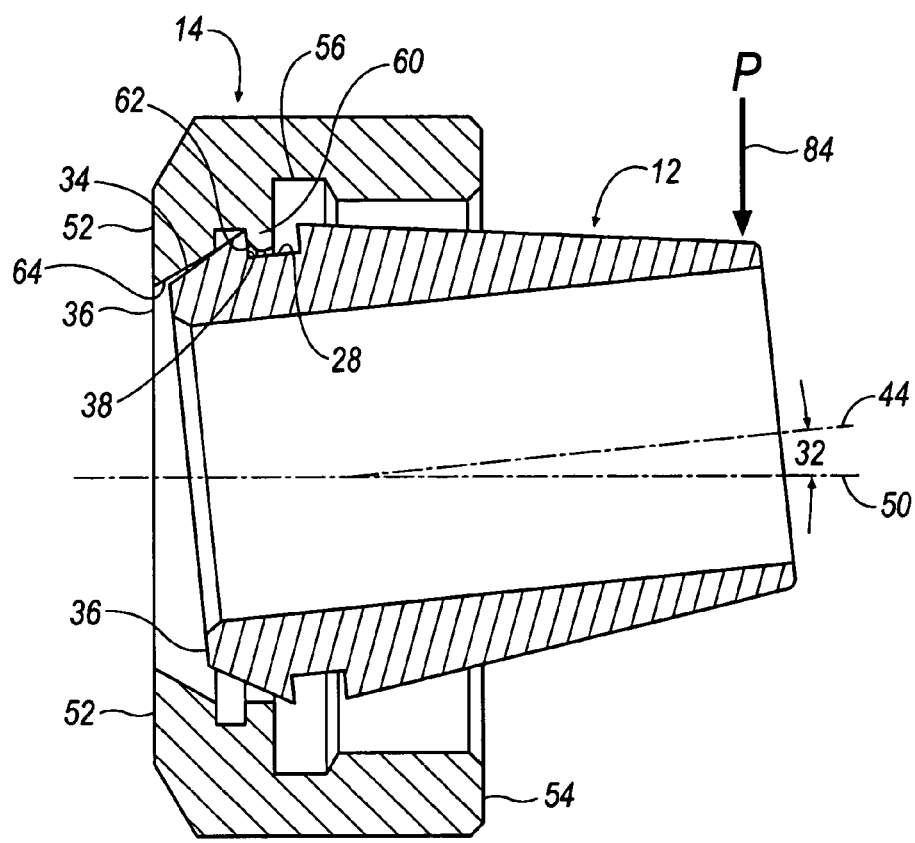
FIG. 10 is a cross-sectional view of the collet and lock nut assembly in an unlocked position during partial assembly according to the invention.
Figure 11:
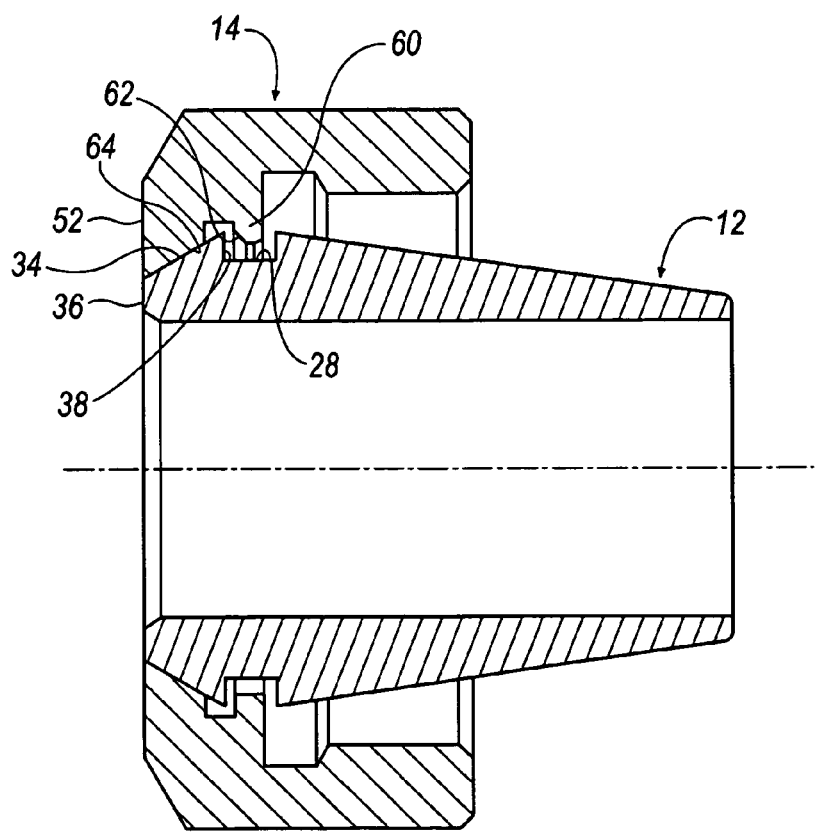
FIG. 11 is a cross-sectional view of the collet and lock nut assembly in a locked position after complete assembly according to the invention.

Referring now to FIGS. 10 and 11, the assembly and removal of the collet and lock nut assembly 10 of the invention will now be described. First, the collet 12 is hooked in an angular fashion such that groove wall 38 of the collet 12 engages the tab wall 62 of the second groove 58 of the lock nut 14. As shown in FIG. 10, the rotation axis 44 of the collet 12 forms an angle 32 with respect to the rotation axis 50 of the lock nut 14 when the collet 12 is hooked in such an angular fashion. As pressure, P, is applied in the direction of the arrow 84 to the body portion 26 of the collet 12, the widths of some or all of the slots 30 of the collet 12 are sufficiently deformed so as to effectively reduce the diameter 35 of the nose portion 24 of the collet 12 to enable the remainder of the relatively larger nose portion 24 to enter inside the relatively smaller bore 48 of the lock nut 14. Because portions of the bore 48 have been removed to produce the retention tabs 72, the clear portions 74 allow the nose portion 24 with the reduced diameter to clip inside the second groove 58 of the collet 12, thereby placing the collet and the lock nut assembly 10 in a locked position.

As shown in FIG. 11, once the retention tabs 72 are clipped inside the second groove 58 and the collet and the lock nut assembly 10 is in a locked position, the angled outer surface 34 of the collet 12 fully engages the angled surface 64 of the lock nut 14. In addition, the front surface 36 of the collet 12 is substantially flush with the front surface 52 of the lock nut 14. This flush relation is preferred because, upon removing a coolant ring (not shown) mounted to the front of the collet and lock nut assembly 10, the collet 12 is neither extending from nor recessed within the lock nut 16. Consequently, the length of the collet and lock nut assembly 10 is minimized, as desired.

Further, the retention tabs 72 of the lock nut 14 are received in the groove 28 of the collet 12. When clockwise torque is applied to the lock nut 14, the surface 64 moves back enough to come into contact with the angled outer surface 34 of the collet 12 and the body portion 26 is drawn into the chuck 70. When clockwise torque is applied to the lock nut 14, the retention tab 72 sufficiently moves backwards such that a tab wall 73 clears the groove walls 38, 101 of the collet 12. As counter-clockwise torque is further applied to the lock nut 14, the tab wall 73 of the retention tab 72 supplies a surface sufficient enough to push against the groove wall 38 of the collet 12 and draw the collet 12, along with the cutting tool, out of the chuck 70 of the tool holder 18. In the illustrated embodiment, three retention tabs 72 provide three concentric contact points to positively draw the collet 12 and cutting tool out of the chuck 70 of the tool holder 18. It will be appreciated that the greater number of retention tabs 72, the greater number of contact points to positively draw the collet 12 and cutting tool out of the chuck 70 of the tool holder 18.

The retention tabs 72 enable the collet 12 to be easily removed from the lock nut 14 by applying pressure laterally in the direction of the arrow 84 against the body portion 26 of the collet 12. One aspect of the invention is that the pressure can be applied in any circumferential, lateral direction against the body portion 26 of the collet 12 (i.e., 360 degrees about the body portion 26 of the collet 12), unlike conventional assemblies that require the pressure to be applied in a specific direction against the collet.

As described above, the collet and lock nut assembly 10 of the invention can be easily assembled by clipping the collet 12 into the inside of the lock nut 14. In addition, the collet and lock nut assembly 10 of the invention provides for a plurality of contact points to positively draw the locked collet and cutting tool out of the chuck of the tool holder.

The patents, patent applications and documents referenced herein are hereby incorporated by reference.

While this invention has been described with respect to several preferred embodiments, various modifications and additions will become apparent to persons of ordinary skill in the art. All such variations, modifications, and variations are intended to be encompassed within the scope of this patent, which is limited only by the claims appended hereto.

What is claimed is:

1. A collet and lock nut assembly, comprising:
a collet having a nose portion and a body portion separated by an annular groove, the collet including a plurality of gripping fingers having a radial dimension; and
a lock nut having a concentric bore with a plurality of retention tabs having a radial dimension and a corresponding number of clear portions,
wherein the radial dimension of each retention tab is less than the radial dimension of each gripping finger, and
wherein the plurality of retention tabs are capable of being received within the groove of the collet to place the assembly in a locked position.

2. The assembly of claim 1, wherein the nose portion of the collet includes a front surface, and wherein the lock nut includes a front surface that is substantially flush with the front surface of the collet when the assembly is in the locked position.

3. The assembly of claim 1, wherein the collet includes an angled nose defining a nose diameter, and wherein the lock nut includes an angled surface that engages the angled nose of the collet when the assembly is in the locked position.

4. The assembly of claim 1, wherein a centerline of the collet is offset with a centerline of the lock nut prior to the assembly being placed in the locked position.

5. The assembly of claim 1, wherein the collet includes a plurality of slots, and wherein at least one slot is deformed while placing the assembly in the locked position.

6. The assembly of claim 1, wherein the groove of the collet includes a groove wall, and wherein at least one retention tab includes a tab wall that engages the groove wall of the collet when torque is applied to the lock nut.

7. The assembly of claim 1, wherein the plurality of retention tabs are symmetrically located about the bore.

8. The assembly of claim 1, wherein the collet is removed from or assembled to the lock nut by applying pressure in any circumferential, lateral direction against the collet.

9. A collet and lock nut assembly, comprising:
a collet having a nose portion and a body portion separated by an annular groove, the collet including a plurality of slots separated by gripping fingers having a radial dimension; and
a lock nut having a concentric bore with a plurality of retention tabs having a radial dimension for contacting the groove of the collet to draw the collet out of a chuck of a tool holder,
wherein the radial dimension of each retention tab is less than the radial dimension of each gripping finger.

10. The assembly of claim 9, wherein the groove of the collet includes a groove wall, and wherein at least one retention tab has a tab wall that is capable of engaging the groove wall of the collet when torque is applied to the lock nut.

11. The assembly of claim 9, wherein the nose portion of the collet includes a front surface, and wherein the lock nut includes a front surface that is substantially flush with the front surface of the collet when the assembly is in a locked position.

12. The assembly of claim 9, wherein the collet includes an angled nose defining a nose diameter, and wherein the lock nut includes an angled surface that engages the angled nose of the collet when the assembly is in a locked position.

13. The assembly of claim 9, wherein a centerline of the collet is offset from a centerline of the lock nut prior to the assembly being placed in a locked position.

14. The assembly of claim 9, wherein at least one slot is deformed while placing the assembly in a locked position.

15. The assembly of claim 9, wherein the collet is removed from or assembled to the lock nut by applying pressure in any circumferential, lateral direction against the collet.

* * * * *